(12) United States Patent
Nogami et al.

(10) Patent No.: US 7,611,572 B2
(45) Date of Patent: Nov. 3, 2009

(54) PIXEL-FORMING COLORANT COMPOSITIONS AND THEIR USE

(75) Inventors: Atsushi Nogami, Chuo-ku (JP); Takami Minami, Chuo-ku (JP); Shigeru Sakamoto, Chuo-ku (JP); Hisao Okamoto, Chuo-ku (JP); Yoshimasa Tsuchiya, Chuo-ku (JP); Masanori Takakamo, Chuo-ku (JP); Nakaji Komiyama, Chuo-ku (JP); Michiei Nakamura, Chuo-ku (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 611 days.

(21) Appl. No.: 11/276,811

(22) Filed: Mar. 15, 2006

(65) Prior Publication Data
US 2006/0213394 A1    Sep. 28, 2006

(30) Foreign Application Priority Data
Mar. 28, 2005   (JP)   ............................. 2005-092276
Mar. 28, 2005   (JP)   ............................. 2005-092277

(51) Int. Cl.
C09D 11/00    (2006.01)
C09B 67/50    (2006.01)
C08K 5/00     (2006.01)
G03F 1/00     (2006.01)

(52) U.S. Cl. .................. 106/31.78; 106/410; 106/411; 106/412; 106/413; 430/7; 540/140

(58) Field of Classification Search ................. 430/7; 106/493, 410–413, 31.78
See application file for complete search history.

(56) References Cited

U.S. PATENT DOCUMENTS

| | | | |
|---|---|---|---|
| 4,002,642 A * | 1/1977 | Ische et al. ................... 540/137 |
| 4,018,791 A * | 4/1977 | Spietschka et al. .......... 540/137 |
| 5,961,711 A | 10/1999 | Saikatsu et al. |
| 6,299,676 B1 | 10/2001 | Saikatsu et al. |
| 6,302,953 B1 | 10/2001 | Saikatsu et al. |
| 6,471,766 B2 | 10/2002 | Ohki et al. |
| 7,270,703 B2 * | 9/2007 | Tateishi et al. ........... 106/31.49 |
| 2003/0084820 A1 * | 5/2003 | Okamoto et al. ............. 106/401 |
| 2003/0127023 A1 * | 7/2003 | Grandidier et al. .......... 106/493 |
| 2005/0048384 A1 | 3/2005 | Saikatsu et al. |

FOREIGN PATENT DOCUMENTS

| GB | 585727 | 2/1947 |
|---|---|---|
| JP | 63-286801 A | 11/1988 |
| JP | 2001-064519 A | 3/2001 |
| JP | 2002-114925 A | 4/2002 |
| JP | 2003-183535 A | 7/2003 |
| WO | WO 03/000811 * | 1/2003 |

OTHER PUBLICATIONS

European Patent Office, Extended European Search Report for European Patent Application No. EP 06 00 5668, May 19,2009, European Patent Office, Munich, Germany.
Database WPI Section Ch, Week 200159 Thomson Scientific, London, Great Britain; AN 2001-532077 XP002522620.

* cited by examiner

*Primary Examiner*—Jerry Lorengo
*Assistant Examiner*—Pegah Parvini
(74) *Attorney, Agent, or Firm*—Chapman and Cutler LLP

(57) ABSTRACT

A pixel-forming colorant composition contains at least one green colorant selected from the group consisting of the following pigments (A) and (B) and pigment derivative (C):

(A) a copper phthalocyanine green pigment obtained by reacting at least one of a phthalic acid substituted on average with from 3.5 to 4.0 bromine atoms and a derivative thereof with a copper salt, substituted on average with from 14 to 16 bromine atoms, and substituted with no chlorine atom;

(B) a copper phthalocyanine green pigment obtained by reacting a mixture, which comprises at least one of a phthalic acid having at least one bromine atom and a derivative thereof and at least one of a phthalic acid having at least one chlorine atom and a derivative thereof, with a copper salt, substituted on average with not less than 12 but less than 16 bromine atoms, and substituted on average with not more than 4 but more than 0 chlorine atom(s); and (C) a green pigment derivative obtained by introducing at least one substituent in at least one of the copper phthalocyanine green pigments (A) and (B).

The pixel-forming colorant composition is useful for the formation of G pixels of three primary-color pixels on color filters.

13 Claims, No Drawings

PIXEL-FORMING COLORANT COMPOSITIONS AND THEIR USE

FIELD OF THE INVENTION

This invention relates to pixel-forming colorant compositions, color filters and image display units.

DESCRIPTION OF THE BACKGROUND

Keeping in step with the recent marked developments in information equipment, liquid-crystal color displays have found wide-spread utility in information-display-related equipment as information display units, for example, as display screens in personal computers, mobile information equipment, television sets, projectors, monitors, car navigation systems, cellular phones, electronic calculators and electronic dictionaries, as displays such as information display boards, guidance display boards, function display boards and sign boards, and also as monitor screens in digital cameras and video cameras. As a corollary to this, color filters to be incorporated in liquid color displays are now required to meet still higher qualities in image characteristics such as fineness or definition, color density, light transmittance, and contrast.

The color tones of three primary-color pixels, specifically red (which may hereinafter be abbreviated as "R") pixels, green (which may hereinafter be abbreviated as "G") pixels and blue (which may hereinafter be abbreviated as "B") pixels on a color filter for use in a liquid color display are required to conform with the corresponding maximum emission wavelengths (for example, R: 610 nm, G: 545 nm, B: 435 nm) in the energy distribution of a three-wavelength fluorescent lamp used as an illustrative backlight. The G pixels are required to have a transmission wavelength in conformity with the maximum transmission wavelength (=545 nm) of the G color of the three-wavelength fluorescent lamp, to have a high transmittance for the maximum transmission wavelength, and to block R and B light emissions.

Green pigments commonly employed as colorants in synthetic resins, printing inks and the like include C.I. Pigment Green (hereinafter abbreviated as "PG") 7 (copper polychlorophthalocyanine pigment) and PG36 (copper polybromopolychlorophthalocyanine pigment). As a green pigment for the formation of G pixels on color filters, mainly used is PG36 which shows a yellowish green color. PG36 is, however, obtained by bromination and chlorination of unsubstituted copper phthalocyanine. Accordingly, the numbers of substituted bromine atoms and chlorine atoms vary from one production batch to another as will be mentioned subsequently herein. G36 is, therefore, accompanied by problems in that its color tone does not remain constant in a yellowish green color suited for color filters and green pigments insufficient in a tincture of yellow are formed abundantly.

To effectively exhibit the optical characteristics of G pixels, a yellow pigment is added in a proportion of from 20 to 100 wt. % based on PG36 to block the transmission of light in a short wavelength range through PG36. The color tone (yellowish green color) of PG36, however, tends to vary from one production lot to another as described above. A yellow pigment is, therefore, added as much as 30 to 120 wt. % based on PG36 to correct the maximum transmission wavelength of the resulting G pixels to 545 nm. As a result, the G pixels are accompanied by problems in that their transmittance is sacrificed, and due to the addition of the yellow pigment in such a large proportion, neither the hue nor the chromaticity is produced as expected in some parts of a chromaticy diagram.

SUMMARY OF THE INVENTION

An object of the present invention is, therefore, to provide a pixel-forming colorant composition or the like useful for the formation of G pixels of three primary-color pixels on a color filter.

The present inventors have found that as green pigments for use in G pixels on color filters, polybrominated copper phthalocyanine green pigments substituted with 14 or more bromine atoms present a strongly-yellowish green color, and especially that the maximum transmission wavelength of a transmission spectrum of a thin film with a finely-divided hexadecabrominated copper phthalocyanine green pigment contained therein ranges from 530 to 545 nm. The present inventors have also found that such polybrominated copper phthalocyanine green pigments, especially the finely-divided hexadecabrominated copper phthalocyanine green pigment can solve the above-descried defects of the commercially-available PG36, specifically its drawbacks such as the variations in the hue of the yellowish green color of the pigment and the reductions in pixel density and transmittance and the narrowing of color hue and chromaticy ranges due to the addition of a yellow pigment for the control of the transmission wavelength. These findings have now led to the completion of the present invention.

In one aspect of the present invention, there is thus provided a pixel-forming colorant composition comprising at least one green colorant selected from the group consisting of the following pigments (A) and (B) and pigment derivative (C):

(A) a copper phthalocyanine green pigment obtained by reacting at least one of a phthalic acid substituted on average with from 3.5 to 4.0 bromine atoms and a derivative thereof with a copper salt, substituted on average with from 14 to 16 bromine atoms, and substituted with no chlorine atom (which may hereinafter be called "the green pigment (A)");

(B) a copper phthalocyanine green pigment obtained by reacting a mixture, which comprises at least one of a phthalic acid having at least one bromine atom and a derivative thereof and at least one of a phthalic acid having at least one chlorine atom and a derivative thereof, with a copper salt, substituted on average with not less than 12 but less than 16 bromine atoms, and substituted on average with not more than 4 but more than 0 chlorine atom(s) (which may hereinafter be called "the green pigment (B)"); and (C) a green pigment derivative obtained by introducing at least one substituent in at least one of the copper phthalocyanine green pigments (A) and (B) (which may hereinafter be called "the green pigment C").

In the above-described first aspect of the present invention, the phthalic acid derivative as a reactant for the copper phthalocyanine green pigment (A) may preferably be at least one phthalic acid derivative selected from the group consisting of phthalic anhydrides, phthalodinitriles, phthalimides, phthalamides and phthalamic acids, each of which has been substituted on average with from 3.5 to 4.0 bromine atoms, and salts thereof; the at least one of the phthalic acid having at least one bromine atom and the derivative thereof may preferably be a compound selected from the group consisting of dibromophthalic acid, tribromophthalic acid and tetrabromophthalic acid, anhydrides thereof, dinitrile, acid imide, acid amide and amidic acid derivatives thereof, and salts thereof, and the at least one of the phthalic acid having at least one chlorine atom and the derivative thereof may preferably be a compound selected from the group consisting of tribromomonochlorophthalic acid, an anhydride thereof, dinitrile, acid imide, acid amide and amidic acid derivatives thereof, and salts thereof; the green colorant may preferably be at least one of a mixture of copper hexadecabromophthalocyanine green pigment and copper pentadecabromophthalocyanine sulfonate and a mixture of copper tetradecabromodichlorophthalocyanine green pigment and copper tetradecabromomonochlorophthalocyanine sulfate.

In the above-described first aspect of the present invention, the green colorant may preferably have an average particle size of from 10 to 130 nm; the green colorant may preferably be a finely-divided pigment obtained by conducting kneading and grinding together with a water-soluble salt in a kneader and having an average particle size of from 10 to 150 nm; the green pigment derivative (C) may preferably have at least one substituent other than a bromine or chlorine atom at a position substituted with neither a bromine atom nor a chlorine atom; the at least one substituent other than a bromine or chlorine atom may be selected preferably from the group consisting of hydrocarbon groups having 1 to 25 carbon atoms, anionic, cationic and nonionic groups, and residual groups of addition polymers and addition condensation products each of which may contain one or more of the hydrocarbon, anionic, cationic and nonionic groups.

In the above-described first aspect of the present invention, the green colorant may be dispersed preferably in at least one of organic liquid media, organic liquid-water mixed media, aqueous media and solid resin media; the pixel-forming colorant composition may preferably further comprise a yellow pigment; and the pixel-forming colorant composition may preferably further comprises, as a film-forming material, at least one of polymers, oligomers and monomers.

In another aspect of the present invention, there is also provided a pixel-forming ink comprising, as a colorant component, a pixel-forming colorant composition according to the one aspect of the present invention; and in a further aspect of the present invention, there is also provided a color filter fabricated using the above-described pixel-forming ink.

The use of at least one of the green pigment (A), the green pigment (B) and the green pigment derivative (C), each of which has a maximum transmission wavelength on a longer wavelength side than the conventional green pigments, as a green colorant in the G pixels of three primary-color pixels on a color filter makes it possible to provide the G pixels with excellent optical characteristics such as high optical density, high light transmission and high contrast.

The undesirable adoption of PG36 as a colorant composition for the formation of G pixels on a color filter may also be related to the particle size and the like of the pigment, and therefore, may not necessarily be attributable only to the structure of the pigment. Nonetheless, the total number of bromine atoms and chlorine atoms, especially the number of bromine atoms introduced onto the benzene rings of the phthalocyanine skeleton is a significant factor for the development of a yellowish green color. The production of PG36 is industrially carried out, for example, by dissolving copper phthalocyanine in a molten mixture of anhydrous aluminum chloride and sodium chloride as a solvent and then using bromine gas and chlorine gas to introduce bromine atoms and chlorine atoms, namely, the so-called "post-bromination and post-chlorination method".

Commercially-available products of PG36 were purchased, finely-divided, and then analyzed for the contents of bromine and chlorine in those commercially-available products In Table 1, their analysis results are shown along with their maximum transmission wavelengths as G pixels of color filters—said G pixels making use of the commercially-available PG36 products, respectively—and the ratings of color tones of the respective G pixels. As test samples, nine (9) lots of PG36 were chosen. To purify the pigment of each lot, the powdery pigment was dissolved in 100 wt. % sulfuric acid, the resulting solution was poured into a great deal of water to have the pigment precipitated, and the precipitate was washed successively with an aqueous alkali solution, dimethylformamide (DMF) and ethanol. From the elemental analysis results of Table 1, the contents of bromine ranged from 66.6 wt. % to 60.4 wt. % (64.4 wt. % on average), and 6.2 wt. % as the difference between the upper and lower limits in the above range are equivalent to about 9 wt. % based on the average. The contents of bromine, on the other hand, ranged from 8.08 wt. % to 5.74 wt. % (6.51 wt. % on average), and 2.34 wt. % as the difference between the upper and lower limits in the above range are equivalent to about 36 wt. % based on the average. As appreciated from the foregoing, the contents of bromine and chlorine in commercially-available PG36 vary widely.

TABLE 1

Analysis Results of PG36 and Its Assessment as Green Pigment for G Pixels

| Lot of pigment | Bromine and chlorine contents | | Assessment as green pigment for G pixels | |
|---|---|---|---|---|
| | Bromine content (%) | Chlorine content (%) | Maximum transmission wavelength (nm) | Ranking of G color |
| 1 | 65.5 | 8.08 | 515 | D⁻ |
| 2 | 60.7 | 6.97 | 516 | D |
| 3 | 60.4 | 5.83 | 518 | B |
| 4 | 65.6 | 5.74 | 515 | D⁻ |
| 5 | 64.2 | 6.53 | 518 | B |
| 6 | 66.4 | 6.46 | 516 | D |
| 7 | 66.6 | 6.95 | 520 | A |
| 8 | 65.8 | 6.19 | 518 | B |
| 9 | 66.6 | 5.88 | 517 | C |

(Note)
A: Most suitably usable as a green pigment for color filters.
B: Addition of a yellow pigment in a greater proportion can correct its color to such an extent as permitting its use as a green pigment for color filters.
C: Addition of a yellow pigment in a still greater proportion can correct its color to such an extent as barely permitting its use as a green pigment for color filters.
D: Even when subjected to a color correction with a yellow pigment, still unusable as a green pigment for filters due to reductions in color density and transmittance.

A comparison between the analysis results of bromine and chlorine and the rankings of the individual commercially-available products of the pigment as green pigments for G pixels does not necessarily indicate any direct correlation between them. It is, however, appreciated that PG36 shows a yellowish green color tone when it contains a substantially large number of introduced bromine atoms and also a significantly large number of chlorine atoms introduced to a like number of remaining substitutable positions. When the number of introduced bromine atoms is small, on the other hand, an introduction of chlorine atoms provides PG36 with a bluish color tone. Even when the number of substituted chlorine atoms decreases and hence, the content of bromine atoms increases, PG36 is insufficient in a tincture of yellow and is not acceptable as a green pigment for current color filters.

Such substantial variations in the contents of bromine and chlorine are attributed to the reliance of the production process of PG36 on "the post-bromination and post-chlorination method" of copper phthalocyanine. Variations are, therefore, unavoidable in the kinds and numbers of halogen substituents in industrially-produced PG36. It is, hence, necessary to choose and use only acceptable production lots of commercially-available PG36. The above-described variations in the kinds and numbers of halogen substituents have made it difficult to industrially and stably produce a suitable G-pixel-forming ink for color filters and as a consequence, the above-mentioned high-quality color filters. The present invention has solved the above-described problem.

DETAILED DESCRIPTION OF THE INVENTION AND PREFERRED EMBODIMENTS

The present invention will next be described more specifically based on best modes for carrying out the present invention. The green pigment (A) for use in the present invention is obtained by reacting a phthalic acid, which has been substituted on average with from 3.5 to 4.0 bromine atoms, and/or its derivative with a copper salt, contains s from 14 to 16 bromine atoms on average, and does not contain any chlorine atom. Examples of the phthalic acid derivative include phthalic anhydrides, phthalodinitriles, phthalimides, phthalamides and phthalamic acids, in each of which the number of bromine atoms substituted per molecule is from 3.5 to 4.0 on average, and their alkali metal salts such as sodium and potassium salts.

The green pigment (A) for use in the present invention can be obtained by mixing urea, cupric chloride, a condensation catalyst and the like with one of the above-described polybromophthalic acid, and then reacting them in a manner known per se in the art. Illustrative of the condensation catalyst are ammonium molybdate, titanium tetrachloride, and zirconium tetrachloride. As a reaction solvent, nitrobenzene, trichlorobenzene, 1-chloronaphthalene or the like can be used, for example. As reaction conditions, the reaction can be conducted at 175 to 200° C. for 2 to 4 hours. In the reaction, there are no substantial differences in reactivity among the above-described polybromophthalic acids. After the reaction, the solvent is removed to obtain a crude pigment (i.e., a colorant before its conversion into a pigment). The crude pigment is dissolved in 7 to 20 volumes of 100 wt. % sulfuric acid or fuming sulfuric acid. The resulting solution is poured into iced water to have the pigment precipitated, so that the green pigment (A) for use in the present invention is afforded. More preferably, the precipitate may be washed with an aqueous alkali solution and may then be purified with an solvent such as an alcohol or DMF.

It is preferred to control the particle size of the thus-afforded pigment. The particle size control of the pigment can be conducted by allowing crystals of the purified pigment to grow in accordance with the solvent finish method or the like and then kneading and grinding it together with a water-soluble salt and, if necessary, a water-soluble organic solvent in a kneading machine such as kneader. The average particle size of the pigment subjected to such particle size control ranges generally from 10 to 150 nm, preferably from 20 to 110 nm. The ground aggregates of the pigment, which have been obtained as a result of the particle size control, are suspended in an aqueous solution of diluted sulfuric acid to dissolve and remove salts and the water-soluble organic solvent. The precipitate is collected by filtration, and is washed with water to obtain a wet filter cake. Optionally, the filter cake may be dried and ground into a finely-divided pigment, or the filter cake may be coprecipitated or kneaded with a readily-dispersible polymer into a processed pigment. The pigment can be used in the form of the wet filter cake, the finely-divided pigment, or the processed pigment.

The green pigment (A) for use in the present invention has a maximum transmission wavelength on a longer wavelength side than PG36 which is used in common, and produces a strongly-yellowish green color. Moreover, the use of a polybromophthalic acid for the synthesis of the green pigment (A) makes it possible to determine the content of bromine atoms at the time of the selection of the raw material and then to conduct the synthesis with the raw material. The resulting green pigment (A) is, therefore, substantially unchanged in the number of substituted bromine atoms, thereby leading to a merit that upon fabrication of color filters, their G pixels can perform color reproductions without variations.

The green pigment (B) for use in the present invention is similar to the above-described green pigment (A) except that as raw materials for the pigment, at least one of a phthalic acid having at least one bromine atom and a derivative thereof and at least one of a phthalic acid having at least one chlorine atom and a derivative thereof are used, the number of bromine atoms in the resulting green pigment is controlled on average to 12 or more but less than 16, and the number of chlorine atoms in the resulting green pigment is controlled on average to not more than 4 but more than 0. In essence, the green pigment (B) is, therefore, similar to the green pigment (A) in the production process, the manner of particle size control of the pigment, the substituents other than bromine atoms and chlorine atoms, the manner of their introduction, and its advantageous effects.

As at least one of the phthalic acid having at least one bromine atom and the derivative thereof, at least one compound selected from the group consisting of dibromophthalic acid, tribromophthalic acid and tetrabromophthalic acid, anhydrides thereof, dinitrile, acid imide, acid amide and amidic acid derivatives thereof, and salts thereof is used; and as at least one of the phthalic acid having at least one chlorine atom and the derivative thereof, at least one compound selected from the group consisting of tribromomonochlorophthalic acid, an anhydride thereof, dinitrile, acid imide, acid amide and amidic acid derivatives thereof, and salts thereof is used. The number of bromine atoms and the number of chlorine atoms in the resulting pigment are controlled as described above.

It is also possible to use the green pigment derivative (C) containing one or more substituents, which inhibit excessive crystallization of the pigment, at a like number of positions on one or more benzene rings of the above-described pigment (A) or (B), in which each of the positions is substituted with neither a bromine atom nor a chlorine atom. The substituents in these pigments, other than the bromine atoms and chlorine atoms, will be described subsequently herein.

The above-described pigment derivative (C) with the one or two substituents contained therein can be obtained by using a phthalic acid, which contains the above-described one or two substituents, as a portion of the raw material in combination with the above-described polybromophthalic acid, by introducing the above-described one or two substituents into a copper phthalocyanine compound brominated with 14 to 15 bromine atoms, by substituting one or two bromine atoms with a like number of other substituents, or by a similar method. As the pigment derivative (C) having one or two substituents other than bromine atoms or chlorine atoms exhibits an amorphous or oil-soluble dye-like behavior, it, as a pigment for color filters, has a high transmittance for backlight, does not cause much light scattering, and provides color filters with improved contrast. In addition, a pigment derivative (C) containing one or more ionic groups other than bromine atoms contributes to the dispersion and dispersion stability of the green pigment (A) when used in combination with a polymer dispersant having counter ions.

Examples of the above-described substituents other than bromine atoms and chlorine atoms include hydrocarbon groups having 1 to 25 carbon atoms, more specifically, hydrophobic hydrocarbon groups such as alkyl groups, aryl groups, alkylaryl groups, arylalkyl groups, alkoxyalkyl groups and polyalkylenoxide groups; and hydrophobic, low-molecular groups, residual groups of addition polymers and residual groups of addition condensation products, all of which contain such hydrophobic hydrocarbon groups. Examples of the ionic or water-soluble substituents include anionic, cationic and/or nonionic, water-soluble groups and hydrophilic, low-molecular groups containing such water-soluble groups, more specifically, ionic or water-soluble groups selected from the group consisting of sulfone group, carboxyl group, sulfate group, phosphate group, amino group, quaternary amino group and pyridinium group, salts thereof, polyalkylene oxide groups, and glyceryl group; and hydrophilic residual groups of addition polymers and hydrophilic residual groups of addition condensation products, all of which contain such ionic or water-soluble groups. Particularly preferred is a sulfone group.

The above-exemplified substituents can each substitute to one of positions of the benzene rings in the phthalocyanine skeleton, said positions being substituted by neither a bromine atom nor a chlorine atom, directly or via a connecting group selected from the group consisting of a carboxylate ester group, a carbamido group, a sulfamido group, a sulfate ester group, a phosphate ester group, an ether group, a secondary or tertiary amino group, a (mono or di)-iminotriazinylamino group and a (mono or di)-iminotriazinyloxy group.

The above-described "green pigment (A)", "green pigment (B)" and "green pigment derivative (C)" may collectively called "the green pigment".

The pixel-forming colorant composition according to the present invention may preferably contain the green pigment in a proportion of from 10 to 50 wt. %. The colorant composition is useful as a raw material for an ink to be used for the formation of G pixels on color filters. The production of the ink can be conducted in a similar manner as in the production of conventionally-known inks. The pixel-forming ink according to the present invention, which contains the pixel-forming colorant composition, contains as an essential component the green pigment, and as optional components, may also contain a pigment dispersant, a dispersion stabilizer, a film-forming material, and, if necessary, a film-forming aid, etc. To stably and economically produce the pixel-forming ink with the green pigment contained in a finely-dispersed form, it is preferred to produce the pixel-forming ink via a colorant composition, which contains the green pigment at a high concentration, rather than producing it by directly using the green pigment.

It is desired for the pixel-forming colorant according to the present invention to have a high pigment content by applying optimal conditions to the dispersion of the pigment and also to use, as its components, materials stable to physical factors such as heat and light. Even when producing a photoresist ink, for example, the use of its colorant component as a high-concentration, pixel-forming colorant composition makes it possible to finely disperse the pigment at a high concentration rather than directly producing the ink without going through the high-concentration, pixel-forming colorant composition. The pixel-forming colorant according to the present invention is also meritorious in that it is safe and easy to handle in working, and moreover, in that it is not required to be produced in a large volume insofar as it is produced as a high-concentration, pixel-forming colorant composition.

It is preferred to incorporate the green pigment at a high concentration in at least one medium of an organic liquid medium, an organic liquid-water mixed medium, an aqueous medium or a solid resin medium rather than an ink medium employed for the actual formation of pixels, and then to disperse the pigment at the high concentration by a known method. Preferably, various additives—such as an ionic pigment derivative and an ionic polymer having counter ions to the ionic pigment derivative (as pigment dispersants), a resin as a film-forming polymer, a surfactant, a defoaming agent, a leveling agent, a bonding agent and a silane coupling agent—are added as needed upon incorporating the green pigment. The concentration of the pigment in the pixel-forming colorant composition may generally be from 10 to 50 wt. %, although no particular limitation is imposed thereon. It is to be noted that the term "ionic pigment derivative" as used herein means a compound formed of a pigment molecule and one or more ionic groups such as sulfone groups introduced therein and is a substance employed as a dispersant or dispersion stabilizer for pigments.

The ionic pigment derivative is often added in the case of solvent-based pigment dispersions. To the pigment, the ionic pigment derivative generally called a "synergist" can be added preferably in a proportion of from 0.05 to 40 parts by weight, more preferably, from 0.1 to 20 parts by weight per 100 parts by weight of the pigment. The ionic polymer having the counter ions is also used as a dispersant for the pigment, and can be added preferably in a proportion of from 1 to 50 parts by weight per 100 parts by weight of the pigment.

To produce a liquid, pixel-forming colorant composition, it is preferred to use a random, block and/or graft copolymer, which contains in its molecule groups and/or molecular chains having compatibility with the pigment and also groups and/or molecular chains having compatibility to a solvent. The copolymer also acts as a binder. These ionic polymer dispersants can be used preferably in a total proportion of from 10 to 200 wt. %, more preferably in a total proportion of from 20 to 100 wt. % based on the sum of the pigment and the ionic pigment derivative.

Examples of a pigment disperse usable in the production of the pixel-forming colorant composition according to the present invention include upright medium-containing dispersers such as ball mill, sand mill and bead mill, horizontal medium-containing dispersers such as dynomil and horizontal bead mill, a roll mill, an ultrasonic mill, and a high-speed impact disperser. By conducting dispersion processing a plurality of times with one of the above-exemplified dispersers or by making a combined use of two or more of the above-exemplified dispersers, the pigment can be dispersed in the medium.

Taking into consideration the settling tendency of the pigment in an ink, the flocculating tendency of the pigment in the ink during storage, and pixel characteristics governing the quality of displayed images, such as the optical density, chroma, sharpness, transmissibility and contrast of the pixels, the desired particle size of the dispersed pigment in the present invention may range from 10 to 130 nm, preferably from 20 to 110 nm in terms of average particle size. As a method for obtaining a pigment dispersion having a desired particle size distribution, a grinding medium for a disperser can be made smaller, the packing rate of the grinding medium can be made greater, the processing time can be made longer, the delivery rate can be made slower, or classification and separation can be conducted with a filter, an ultracentrifuge or the like subsequent to grinding. Further, two or more of such methods can be used in combination.

To bring the transmission spectrum of the green pigment, which are to be used for the formation of G pixels on color filters, into conformity with a transmission spectrum preset for the G pixels, for example, to bring its maximum transmission wavelength into conformity with 545 nm, and to lower the transmittance of 400 nm to 500 nm the blocking of which is desired, a yellow pigment capable of showing a preferred transmission spectrum may be added. Upon preparation of such a pigment dispersion, the green pigment and yellow pigment can be separately dispersed into pixel-forming colorant compositions, which can then be mixed together at a predetermined ratio; or a mixture of the green pigment and yellow pigment at a predetermined ratio can be dispersed at once. Examples of the complementary yellow pigment include Pigment Yellow (PY) 62, 74, 83, 138, 139, 150, 155 and 185.

Numerous known pigments have been conventionally employed as pigments for forming R and B pixels to be used in combination with G pixels formed with the above-described green pigment. Usable examples include azo pigments such as insoluble azo pigments, soluble azo pigments and high-molecular azo pigments; quinacridone pigments such as quinacridone red pigments and quinacridone magenta pigments; diketopyrrole pigments; anthraquinone pigments; perylene pigments; phthalocyanine pigments such as phthalocyanine blue pigments; isoindolinone pigments; dioxazine pigments such as dioxazine violet; quinophthalone yellow pigments; and complex pigments such as nickel azo yellow.

Specific examples of representative pigments for R and B pixels include Pigment Red (PR) 177, 242 and 254 as red pigments; Pigment Yellow (PY) 83, 138, 139, 150 and 185 as complementary yellow pigments; Pigment Blue (PB) 15:6 and 60 as blue pigments; Pigment Violet (PV) 23 as a complementary violet pigment; and further, coprecipitated pigments, solid solution pigments and mixed-crystal pigments between the above-described red pigments and yellow pigments.

Preferably, the colorant composition and ink according to the present invention can additionally contain a film-forming material. No particular limitation is imposed on the film-forming material, and the known film-forming materials, which have been conventionally used in colorant compositions for color filters, are all usable. When the pixel-forming ink is of the photolithographic development type (photosensitive type), a radiation-curable film-forming material is used as a film-forming material. In the case of an addition-polymerizing or addition-crosslinking ink, on the other hand, a heat- or radiation-curable film-forming material such as a heat-polymerizing, laser-beam-polymerizing, ultraviolet-polymerizing, photocation-polymerizing or electron-radiation-polymerizing film-forming material is used.

Such film-forming materials as exemplified above can be conventionally-known monomers, oligomers and/or polymers containing one or more unsaturated double bonds or polymerizable cyclic ether rings having addition polymerizability or addition crosslinkability; and addition-polymerizing or addition-crosslinking binders composed of such monomers, oligomers and/or polymers in combination with polymerization initiators and liquid media added as needed.

Specific examples of the film-forming material include, as monomers, (meth)acrylates such as pentaerythritol di(meth)acrylate, dipentaerythritol tetra(meth)acrylate, dipentaerythritol hexa(meth)acrylate, bisphenol A epoxy resin di(meth)acrylate, bisphenol F epoxy resin di(meth)acrylate, and bisphenol-fluorene epoxy resin di(meth)acrylate.

The specific examples of the film-forming material also include, as polymers, (meth)acrylic acid (co)polymers, (meth)acrylate (co)polymers, styrene (co)polymers, and (meth)acrylate-styrene copolymers; polyester acrylate resins, polyepoxy acrylate resins, polyurethane acrylate resins, polyether acrylate resins, and polyol acrylate resins; and photosensitive cyclized rubber resins, photosensitive phenol resins, photosensitive polyacrylate resins, photosensitive polyamide resins, photosensitive polyimide resins, and unsaturated polyester resins. They can be used either singly or in combination. For the purpose of providing improved post-imagewise-exposure developability, these resins may preferably contain an alkali-soluble substituent groups such as carboxyl groups and/or phenolic hydroxyl groups in their side chains.

As the polymerization initiators, known photopolymerization initiators, for example, 1-hydroxycyclohexylphenyl ketone, 2-hydroxy-2-methyl-1-phenylpropane-1-one, 2,2-diethoxyacetophenone, 2-methyl-1-(4-(methylthio)phenyl)-2-morpholinopropane-1-one, and 2-benzyl-2-(N,N-dimethylamino)-1-(4-morpholinophenyl) butanone-1.

The color filter according to the present invention can be obtained by forming G pixels with the above-described photosensitive pixel-forming ink in combination with pixels of other colors. For the formation of the pixels, a known pixel-forming process for color filters can be used, and no particular limitation is imposed in this regard. To form pixels for a color filter on a substrate, for example, the photosensitive pixel-forming ink is coated over the entire surface of the substrate by using, for example, a spin coater, a roll coater, a slit coater, a printing machine or the like. Subsequent to predrying, a photomask is brought into close contact with the thus-coated surface, and with an extra-high pressure mercury vapor lamp, exposure is performed to bake a pixel pattern. Development and washing are then performed, and post-baking is performed as needed, thereby forming a pixel pattern for the color filter.

As a process for forming pixels for a color filter with a non-photosensitive pixel-forming ink, on the other hand, pixels can be directly printed on a substrate by using the non-photosensitive pixel-forming ink as a pixel-forming printing ink such as a letterpress ink, flexographic ink, lithographic ink, intaglio gravure ink or stencil screen ink, for example, as proposed in Japanese Patent Applications 2004-209788 and 2005-011333. Other usable processes include pixel-forming processes making use of inkjet printing, dispenser injection, electronic printing or electrostatic printing; and a color-pixel forming process relying upon electrocoating.

Subsequently, baking, surface-smoothening grinding and/or surface-protecting top coating is performed as needed in a manner known per se in the art. A black matrix can be formed in a manner known per se in the art to obtain a color filter having RGB pixels thereon. As an alternative, a three primary-color pixels can be formed on a transfer or bonding film, followed by the transfer or bonding of the three primary-color pixels onto a substrate for a color filter. These processes for the formation of pixels for color filters are known, and therefore, no particular limitation is imposed on the process for the formation of pixels for a color filter in the present invention.

As film-forming materials for these pixel-forming inks, conventionally-known dry-set-type film-forming materials can be also used. They can each be used in the form of a solution in a solvent, an aqueous solution, an emulsion, a latex or a solid hot-melt resin. As such film-forming materials, random, block and/or graft copolymers which contain or do not contain reactive groups can also be used. These film-forming materials may each additionally contain a crosslinking agent as needed.

Specific examples of resin varnishes for inks of the type that films are formed upon drying include (meth)acrylate (co)polymers, styrene-maleate (co)polymers, (meth)acrylate-styrene copolymers, epoxy resins, aminoalkyd resins, polyester resins, amino-resin-modified polyester resins, polyurethane resins, acrylic polyol urethane resins, soluble polyamide resins, soluble polyimide resins, soluble polyamide-imide resins, and soluble polyester-imide resins; and water-soluble salts of (meth)acrylate (co)polymers, water-soluble salts of styrene-maleate copolymers, water-soluble aminoalkyd resins, and water-soluble aminopolyester resins. They can be used either singly or in combination.

As monomers having one or more groups reactive to crosslinking agents, (meth)acrylic acid, maleic acid, 2-hydroxy($C_{2-6}$-alkyl)(meth)acrylate, polyethylene glycol(meth)acrylate, glycidyl(meth)acrylate, N-methylol(meth)acrylate, isocyanatoethyl(methacrylate) and the like can be mentioned. As the crosslinking agents, trimethylolpropane polyglycidyl ether, pentaerythritol polyglycidyl ether, methoxymethylolated melamine, butoxymethylolmelamine, polyhexamethylenecarbodiimide, trimethylolpropane-tris(tolylene diisocyanate) adduct, trimethylolpropane-tris(hexamethylene diisocyanate) adduct and the like can be mentioned.

Examples of the pigment dispersion medium for the pixel-forming ink include alcohols such as propanol; alkylene glycols such as (mono to poly)ethylene glycols and (mono to poly)propylene glycols, and their monoalkyl ethers, dialkyl ethers and monoalkyl ether monoacylates; esters such as ethyl acetate, butyl acetate, ethyl lactate and γ-butyrolactone; ketones such as methyl ethyl ketone, methyl isobutyl ketone and cyclohexanone; aliphatic hydrocarbon solvents such as decane, "ISOPAR" (trademark, product of Exxon Chemical Japan Ltd.) and "SHELL SOL" (trademark, product of Shell Japan Ltd.); alicyclic hydrocarbon solvents such as cyclohexanone and methylcyclohexanone; aromatic hydrocarbon solvents such as xylol; and nitrogen-containing solvents such as DMF, dimethylacetamide, N-methyl-2-pyrrolidone, 2-pyrrolidone, and 1,3-dimethyl-2-imidazolidinone.

When a pixel-forming ink is a water-based ink, its aqueous medium is water or a mixed solvent of water and a water-soluble organic solvent. As water, it is preferred to use deionized water, distilled water or the like. Examples of the water-soluble organic solvent for use in the aqueous mixed solvent include conventionally-known water-soluble organic solvents, specifically, lower alcohols such as ethyl alcohol and propanol; polyhydric alcohols such as (mono to poly) ethylene glycols, (mono to poly)propylene glycols and (mono to poly)glycerins, and their lower alkyl ethers such as their methyl ethers, ethyl ethers and propyl ethers; and nitrogen-containing solvents such as N-methyl-2-pyrrolidone and 2-pyrrolidone.

Color filters formed using the colorant composition or ink according to the present invention can be incorporated in image display units such as liquid-crystal color displays, and can be assembled in various information-display-related equipment such as display screens in personal computers, mobile information equipment, television sets, projectors, monitors, car navigation systems, cellular phones, electronic calculators and electronic dictionaries, as displays such as information display boards, guidance display boards, function display boards and sign boards, and also as monitor screens in digital cameras and video cameras.

A description has been made in the above primarily about the formation of pixels for color filters. It is, however, to be noted that the pixel-forming colorant composition according to the present invention is also suited for various other applications, for example, as colorant compositions for synthetic or natural resins and paints, as printing inks for plastic films, various paper and synthetic paper, as colorant compositions for paper, as textile printing inks for woven fabrics, and as green pigment colorant compositions for color copier toners, inkjet printer inks and thermal transfer ribbon inks, and can provide colored products of excellent green color accordingly.

EXAMPLES

The present invention will next be described in further detail based on certain specific examples. It is to be noted that in the following examples, the designations "part", "parts" and "%" are each on a weight basis unless otherwise specifically indicated. Further, the numbers of bromine atoms and chlorine atom(s) substituted in each of the below-described copper phthalocyanines green pigments are their numbers calculated from a charge ratio of the corresponding raw materials employed.

Examples and Comparative Example on the Green Pigment (A)

Example A-1

Production of Copper Hexadecabromophthalo-cyanine Green Pigment (1) Synthesis of Copper Hexadecabromophthalocyanine A synthesis reactor having a reaction vessel, which was fitted with a stirrer, a reflux condenser and a thermometer, and a heater was provided. The content of bromine atom in tetrabromophthalic anhydride as a raw material is 69.0%, and the number of bromine atoms substituted per molecule is 4.0. Trichlorobenzene (172.8 parts), the above-described tetrabromophthalic anhydride (40.0 parts), urea (23.3 parts), titanium tetrachloride (6.36 parts) and cupric chloride (3.0 parts) were charged in the reaction vessel, and under heating, a reaction was conducted. The temperature was gradually raised from 100° C. to 175° C., at which the reaction mixture was stirred, as was, for 3 hours to continue the reaction. The reaction temperature shortly before the completion of the reaction was 195° C.

The amount of the thus-obtained crude pigment was 38.6 parts, and the yield of the crude pigment was 97.4%. 98% Sulfuric acid and 20% fuming sulfuric acid were combined together to prepare 100% sulfuric acid. The resultant crude pigment (20 parts) were dissolved in the above-prepared 100% sulfuric acid (140 parts). Subsequent to stirring at 70° C. for 1 hour, the solution was poured into iced water (10 weights) to have the pigment precipitated. The precipitate was collected by filtration, and the filter cake was washed with water. The filter cake was then washed successively with a dilute aqueous solution of sodium hydroxide, ethanol and DMF, and the filter cake was treated further with xylol to afford a purified pigment. The yield of the purified pigment was 93.9%.

By an elemental analysis, the contents of copper element and bromine atoms in the purified pigment were determined to be 3.44% (calculated: 3.456%) and 69.8% (calculated: 69.52%), respectively (the content of chlorine atom(s) was 0%). The average number of bromine atoms substituted per molecule as calculated from the analysis data of the resultant copper hexadecabromophthalocyanine green pigment was 16.1, thereby indicating that sixteen (16) bromine atoms substituted on the phthalocyanine skeleton.

(2) Preparation of a Fine Particulate Green Pigment

The purified pigment (100 parts) obtained in the above-described procedure (1) was charged along with sodium chloride powder (600 parts) and diethylene glycol (110 parts) in a kneader equipped with a pressure lid. Premixing was performed until an evenly-wet mass was formed in the kneader. The pressure lid was then closed, and kneading and grinding was conducted while holding the contents under a pressure of 6 kg/cm$^2$. The kneading and grinding processing was conducted for 2 hours while controlling the temperature to keep the contents at 92 to 98° C.

In 2% sulfuric acid (3,000 parts) which had been heated to 80° C., the thus-obtained ground product was stirred for 1 hour. The precipitate was collected by filtration, and was then washed with water to remove sodium chloride and diethylene glycol, so that a filter cake of a finely-divided green pigment was obtained. To measure the particle size of the thus-obtained pigment, a nonionic surfactant (200% based on the filter cake of the pigment) was added to the filter cake of the pigment. The filter cake of the pigment was ultrasonically dispersed to prepare a pigment dispersion. As a result of a measurement by a particle size measuring instrument, "Model N-4" (trade name; manufactured by Coulter Electronics, Inc.), the average particle size was approximately 40 nm. The filter cake was dried and ground to afford a finely-divided, powdery pigment ("the green pigment A-1 (with 16 bromine atoms)".

Example A-2

Production of Copper Pentadecabromophthalo-cyanine Sulfonate (1) Synthesis of Copper Pentadecabromophthalocyanine In the same synthesis reactor as in the procedure (1) of Example A-1, the following components were charged: trichlorobenzene (172.8 parts), tetrabromophthalic anhydride (30.00 parts), tribromophthalic anhydride (8.23 parts), urea (23.3 parts), titanium tetrachloride (6.36 parts) and cupric chloride (3.0 parts). In a similar manner as in the procedure (1) of Example A-1, synthesis was conducted to obtain a crude pigment. The amount of the crude pigment so obtained was 36.6 parts, and the yield of the crude pigment was 96.5%. Purification of the pigment was also conducted in a similar manner as in Example A-1. The yield of the crude particulate pigment obtained by the purification was 94.1%. This pigment will hereinafter be abbreviated as "15BrCuPc".

(2) Synthesis of 15BrCuPc Sulfonate

The 15BrCuPc (20 parts) obtained in the above-described procedure (1) was dissolved in 20% fuming sulfuric acid (140 parts). The resultant solution was stirred at 110° C. for 2 hours to conduct a sulfonating reaction of the pigment. The reaction mixture was poured into iced water (10 weights) to have the sulfonate precipitated. The precipitate was collected by filtration, and the filter cake was thoroughly washed with water to afford the sulfonate of the 15BrCuPc. This sulfonate will hereinafter be called "the PG sulfonic acid A-1".

Example A-3

Assessment of Green Pigment (1) Preparation of Green Pigment Dispersion

As a pigment dispersant, a 30% solution of a butyl acrylate-styrene-hydroxyethyl acrylate-methacrylic acid (weight ratio: 50/15/10/25) copolymer (average molecular weight: 12,000) in propylene glycol monomethyl ether acetate (hereinafter abbreviated as "PGMA")—hereinafter called "the pigment dispersant PGMA solution A-1"—was prepared in advance.

"The green pigment A-1 (with 16 bromine atoms)" (19 parts) afforded in the procedure (2) of Example A-1, "the PG sulfonic acid A-1" (1 part) afforded in the procedure (2) of Example A-2, a cationic high-molecular dispersant (polyester-amidated polyethylenimine, 50% solution) (12 parts), the above-described "resin dispersant PGMA solution A-1" (50 parts) and PGMA (18 parts) were combined together and were then stirred for 2 hours in a dissolver. After confirming that no pigment aggregates existed any longer, dispersion processing was performed at a circumferential speed of 14 m/s by a horizontal annular bead mill with zirconia-made beads (diameter: 0.65 mm) packed therein. As a result, a green pigment dispersion (hereinafter called "the green pigment colorant composition A-1 (with 16 bromine atoms)") was obtained.

(2) Preparation and Coating of G-Pixel-Forming Ink

To "the green pigment colorant composition A-1 (with 16 bromine atoms)" (100 parts), a photosensitive acrylic resin varnish (50 parts), trimethylolpropane triacrylate (10 parts), 2-hydroxyethyl-2-methylpropane-1-one (2 parts), 2,2-diethoxyacetophenone (1 part) and PGMA (37 parts) were added to obtain a photosensitive green pigment dispersion (hereinafter called "the photosensitive dispersion A-1 of the green pigment (with 16 bromine atoms)"). A glass substrate which had been treated with a silane coupling agent was set on a spin coater, and the above-described "photosensitive dispersion A-1 of the green pigment (with 16 bromine atoms)" was spin-coated firstly at 300 rpm for 5 seconds and then at 1,200 rpm for 5 seconds. The thus-coated glass substrate was then prebaked at 80° C. for 10 minutes. Using an ultra-high pressure mercury vapor lamp, exposure was performed at a light quantity of 100 mJ/cm$^2$ to obtain a green-colored glass substrate (hereinafter called "the green-colored glass substrate A-1 (with 16 bromine atoms)").

Comparative Example 1

(1) Preparation of Fine Particulate Green Pigment

A commercially-available yellowish green pigment, PG36, was chemically analyzed for its bromine atoms and chlorine atoms. As a result, the content of bromine atoms was determined to be 66.6% while that of chlorine atoms was determined to be 6.95%. Assuming that the total number of substituted halogen atoms was 16, the number of the substituted bromine atoms was calculated to be 13 while the number of the substituted chlorine atoms was calculated to be 3. Following the finely-dividing processing applied to the pigment in the procedure (2) of Example A-1, the above-described green pigment was charged together with sodium chloride powder and diethylene glycol in a kneader equipped with a pressure lid, and kneading and grinding was conducted. From the resulting ground product, the salt and solvent were similarly dissolved off. The precipitate was collected by filtration and then washed with water to obtain a filter cake of the finely-divided pigment. The average particle size of the pigment was approximately 40 nm. The filter cake was dried and the ground to afford a finely-divided powdery pigment "PG36A-1".

(2) Preparation of Pigment Dispersion

A "PG36 colorant composition A-1" was obtained in a similar manner as in the procedure (1) of Example A-3 except that "PG36A-1" was used in place of "the green pigment A-1 (with 16 bromine atoms)" and "the PG sulfonic acid A-1", the cationic high-molecular dispersant, the acrylic resin and PGMA were combined with "PG36A-1", the resulting mixture was stirred and deflocculated in the dissolver, and dispersion processing was then performed in the horizontal medium-containing disperser.

(3) Preparation and Coating of G-Pixel-Forming Ink

In place of "the green pigment colorant composition A-1 (with 16 bromine atoms)" in the procedure (1) of Example A-3, "the PG36 colorant composition A-1" obtained in the above procedure (2) was used. The photosensitive acrylic resin varnish, the photosensitive monomer, the photopolymerization initiator and PGMA were combined with "the PG36 colorant composition A-1" to obtain a photosensitive green pigment dispersion, "PG36 photosensitive dispersion A-1".

In a similar manner as the spin-coating operation in the procedure (2) of Example A-3, a glass substrate which had been treated with the silane coupling agent was set on a spin coater, the above-described "PG36 photosensitive dispersion A-1" was coated, and exposure and curing was then conducted to obtain a green-colored glass substrate (hereinafter called "the PG36 green-colored glass substrate A-1").

Example A-4

Assessment of Color Characteristics of the Green-Colored Glass Substrates

"The green-colored glass substrate A-1 (with 16 bromine atoms)" prepared in the procedure (2) of Example A-3 and "the PG36 green-colored glass substrate A-1" prepared in the procedure (3) of Comparative Example 1 were assessed for color characteristics as colors for color filters. The chromaticy (x coordinate, y coordinate) and lightness (Y value) of each of the substrates were measured using a chromoscope ("COLOR ANALYZER TC-1800", trade name; manufactured by Tokyo Denshoku Co., Ltd.). Upon measurement, the CIE Standard illuminant C was used as measuring light. Further, each green-colored glass substrate was held between two polarizing plates, and its contrast was determined from a ratio of the quantity of the light transmitted through the green-colored glass substrate held between the two polarizing plates arranged in parallel Nichols to the quantity of the light transmitted through the green-colored glass substrate held between the two polarizing plates arranged in crossed Nichols.

The chromaticy values, lightness values and contrast values of the green-colored glass substrates prepared in the procedure (2) of Example A-3 and the procedure (3) of Comparative Example 1, respectively, are shown in Table 2. The spectral characteristics of "the green-colored glass substrate A-1 (with 16 bromine atoms)" indicated such high levels of lightness and chroma that a green emission from a three-wavelength fluorescent lamp can be effectively transmitted but a red and blue emissions from the three-wavelength fluorescent lamp can be effectively blocked.

TABLE 2

| Glass substrate for color filter | | Green-colored glass substrate A-1 (with 16 bromine atoms) | PG36 green-colored glass substrate A-1 |
|---|---|---|---|
| Maximum transmission wavelength (nm) | | 530 | 520 |
| Chromaticy | x coordinate | 0.252 | 0.230 |
|  | y coordinate | 0.500 | 0.500 |
| Y value | | 51.2 | 51.3 |

Example A-5

Fabrication of Color Filter (1) Preparation of Fine Particulate R and B Pigments As a green pigment for a color filter, "the green pigment A-1 (with 16 bromine atoms)" of Example A-1 was used. As a red pigment and blue pigment for the color filter, PR254, PY138, PB15-6 and PV23 were provided. Following the finely-dividing processing of the pigment in the procedure (2) of Example A-1, the individual powdery pigments were each separately charged together with sodium chloride powder and diethylene glycol in a kneader equipped with a pressure lid, and subjected to kneading and grinding. From each ground product so obtained, the salt and solvent were similarly dissolved off, the precipitate was collected by filtration and then washed with water. As a result, filter cakes of the individual finely-divided pigments were obtained. The average particle sizes of the finely-divided pigments of the respective colors ranged from 40 to 60 nm. The filter cakes were separately dried and ground to obtain finely-divided powdery pigments of the respective pigments.

(2) Preparation of Pigment Colorant Compositions

In a similar manner as in Example A-3(1) except for the use of the fine particulate, PR254, PY138, PB15-6 and PV23 pigments, which had been obtained in the above procedure (1), in place of "the PG sulfonic acid A-1", those fine particulate pigments were each separately combined with the cationic high-molecular dispersant, the acrylic resin and PGMA, and the resulting mixtures were separately stirred and deflocculated in a dissolver, followed by dispersion processing in a horizontal annular bead mill. As a result, colorant compositions of the respective pigments (hereinafter called "the red colorant composition A-1", "the yellow colorant composition A-1", "the blue colorant composition A-1" and "the violet colorant composition A-1") were obtained.

(3) Preparation of Pixel-Forming Inks

To form PGB pixels on a glass substrate for a color filter, a "photosensitive green-pigment dispersion A-2 (with 16 bromine atoms)", "photosensitive red-pigment dispersion A-1" and "photosensitive blue-pigment dispersion A-1" were obtained in accordance with the formulas in Table 3.

TABLE 3

Preparation of RGB-Pixel-Forming Inks

Unit: part(s) by weight

| | Photosensitive green-pigment dispersion A-2 (with 16 bromine atoms) | Photosensitive red-pigment dispersion A-1 | Photosensitive blue-pigment dispersion A-1 |
|---|---|---|---|
| Green pigment colorant composition A-1 | 63 | — | — |
| Red pigment colorant composition A-1 | — | 85 | — |
| Yellow pigment colorant composition A-1 | 37 | 15 | — |
| Blue pigment colorant composition A-1 | — | — | 85 |
| Violet pigment colorant composition A-1 | — | — | 15 |
| Photosensitive acrylic resin varnish | 50 | 50 | 50 |
| TMPTA | 10 | 10 | 10 |
| HEMPA | 2 | 2 | 2 |
| DEAP | 1 | 1 | 1 |
| PGMA | 37 | 37 | 37 |
| Total | 200 | 200 | 200 |

TMPTA: Trimethylolpropane triacrylate
HEMPA: 2-Hydroxyethyl-2-methylpropane-1-one
DEAP: 2,2-Diethoxyacetophenone (4) Fabrication of a Color Filter A glass substrate which had been treated with the silane coupling agent was set on a spin coater, and "the photosensitive red-pigment dispersion A-1" of the above procedure (3) was spin-coated firstly at 300 rpm for 5 seconds and then at 1,200 rpm for 5 seconds. The thus-coated glass substrate was then prebaked at 80° C. for 10 minutes. A photomask having a mosaic pattern was brought into close contact with the coated surface of the glass substrate. Using an ultra-high pressure mercury vapor lamp, exposure was performed at a light quantity of 100 mJ/cm. Development and washing were then conducted with an exclusive developer and an exclusive rinse, respectively, to form a red mosaic pattern was formed.

Following the above-described process, "the photosensitive green-pigment dispersion A-2 (with 16 bromine atoms)" and "photosensitive blue-pigment dispersion A-1" in Table 3 were subsequently coated and baked to form a green mosaic pattern and blue mosaic pattern, so that an RGB color filter was obtained. The thus-obtained color filter had excellent spectral curve characteristics, was excellent indurability such as light fastness and heat resistance, also had superb properties in light transmission, and showed excellent properties as a color filter for a liquid-crystal color display.

Examples on the Green Pigment (B)

Example B-1

Production of Copper Tetradecabromodichloro-phthalocyanine Green Pigment (1) Synthesis of Copper Tetradecabromodichlorophthalocyanine In the same synthesis reactor as that employed in Example A-1, trichlorobenzene (172.8 parts), tribromomonochlorophthalic anhydride (18.08 parts), tetrabromophthalic anhydride (20.00 parts), urea (23.3 parts), titanium tetrachloride (6.36 parts) and cupric chloride (3.0 parts) were charged. Under the same reaction conditions as in Example A-1, they were reacted to obtain a crude pigment. The amount of the crude pigment was 36.5 parts, and the yield of the crude pigment was 96.7%. That crude pigment was purified in a similar manner as in Example A-1. The yield of the coarse particulate pigment obtained by the purification was 94.4%. By an elemental analysis, the content of bromine and that of chlorine were determined to be 64.3% (calculated: 63.94%) and 4.1% (calculated: 4.053%), respectively. The average numbers of bromine atoms and chlorine atoms substituted per molecule as calculated from the analysis data of the resultant copper tetradecabromodichlorophthalocyanine green pigment (hereinafter abbreviated as "14Br2ClCuPc") were 14.1 and 2.0, respectively, thereby indicating that all the benzene rings in the phthalocyanine skeleton were fully substituted with fourteen (14) bromine atoms and two (2) chlorine atoms.

(2) Preparation of a Fine Particulate Green Pigment by Finely-Dividing Processing Using 14Br2ClCuPc (100 parts) obtained in the procedure (1), a filter cake of a finely-divided green pigment was obtained in a similar manner as in Example A-1. Its average particle size was measured in a similar manner as in Example A-1. As a result, the average particle size was determined to be approximately 40 nm. The procedure of Example A-1 was then followed to obtain a finely-divided powdery pigment (hereinafter called "the green pigment B-1").

Example B-2

Production of Copper Tetradecabromo-monochlorophthalocyanine Sulfonate (1) Synthesis of Copper Tetradecabromomonochlorophthalo-cyanine In the same synthesis reactor as that employed in Example A-1, trichlorobenzene (172.8 parts), tribromomonochlorophthalic anhydride (9.04 parts), tetrabromophthalic anhydride (20.00 parts), tribromophthalic anhydride (8.23 parts), urea (23.3 parts), titanium tetrachloride (6.36 parts) and cupric chloride (3.0 parts) were charged. A reaction was conducted in a similar manner as in Example A-1. The amount of the crude pigment was 35.5 parts, and the yield of the crude pigment was 96.0%. Purification of the pigment was also conducted in a similar manner as in Example A-1. The yield of the coarse particulate pigment of copper tetradecabromomonochlorophthalcyanine (hereinafter abbreviated as "14BrClCuPc") obtained by the purification was 94.6%.

(2) Synthesis of 14BrClCuPc Sulfonate

14BrClCuPc (20 parts) obtained in the procedure (1) was sulfonated in a similar manner as in Example A-2 to obtain the sulfonate of 14BrClCuPc (hereinafter called "the PG sulfonic acid B-1").

Example B-3

Assessment of the Green Pigment B-1

(1) Preparation of a Green Pigment Dispersion

In a similar manner as in Example A-3, "the green pigment B-1" (19 parts), "the PG sulfonic acid B-1" (1 part), a cationic high-molecular dispersant (polyester-amidated polyethylenimine, 50% solution) (12 parts), the same "resin dispersant PGMA solution A-1" (50 parts) as that prepared in Example A-3 and PGMA (18 parts) were combined together to obtain a green pigment dispersion (hereinafter called "the green pigment colorant composition B-1").

(2) Preparation and Coating of a Green-Pixel-Forming Ink and Coating

In a similar manner as in Example A-3 except for the use of "the green pigment colorant composition B-1" (100 parts), a photosensitive green pigment dispersion (i.e., ink) was obtained, and then, a green-colored glass substrate (hereinafter called "the green-colored glass substrate B-1") was obtained.

(3) Assessment of Color Characteristics of the Green-Colored Glass Substrate

Assessment of color characteristics of "the green-colored glass substrate B-1" as a color for a color filter was performed in a similar manner as in Example A-4. The chromaticy value, lightness value and contrast value of the green-colored glass substrates obtained in the procedure (2) of Example B-3 are shown in Table 4. The spectral characteristics of "the green-colored glass substrate B-1" indicated such high levels of lightness and chroma that a green emission from a three-wavelength fluorescent lamp can be effectively transmitted but a red and blue emissions from the three-wavelength fluorescent lamp can be effectively blocked.

TABLE 4

| Glass substrate for color filter | | Green-colored glass substrate B-1 |
|---|---|---|
| Maximum transmission wavelength (nm) | | 527 |
| Chromaticy | x coordinate | 0.241 |
| | y coordinate | 0.500 |
| Y value | | 51.3 |

Example B-4

Fabrication of Color Filter (1) Preparation of Fine Particulate R and B Pigments by Finely-Dividing Processing of R and B Pigments As a green pigment for a color filter, "the green pigment B-1" of Example B-1 was used. As a red pigment and blue pigment for the color filter, the same pigments as those employed in Example A-5 were used. Following the finely-dividing processing of the pigment in the procedure (2) of Example A-1, filter cakes of the individual finely-divided pigments were obtained. The average particle sizes of the finely-divided pigments of the respective colors ranged from 40 to 60 nm. The filter cakes were separately dried and ground to obtain finely-divided powdery pigments of the respective pigments.

(2) Preparation of Pigment Colorant Compositions

In a similar manner as in Example A-3(1) except for the use of the fine particulate, PR254, PY138, PB15-6 and PV23 pigments, which had been obtained in the above procedure (1), in place of "the green pigment B-1" and "the PG sulfonic acid B-1", those fine particulate pigments were each separately combined with the cationic high-molecular dispersant, the acrylic resin and PGMA, and the resulting mixtures were separately stirred and deflocculated in a dissolver, followed by dispersion processing in a horizontal annular bead mill. As a result, colorant compositions of the respective pigments (hereinafter called "the red colorant composition B-1", "the yellow colorant composition B-1", "the blue colorant composition B-1" and "the violet colorant composition B-1") were obtained.

(3) Preparation of Pixel-Forming Inks

To form PGB pixels on a glass substrate for a color filter, a "photosensitive green-pigment dispersion B-2", "photosensitive red-pigment dispersion B-1" and "photosensitive blue-pigment dispersion B-1" were obtained in accordance with the formulas in Table 5.

TABLE 5

Preparation of RGB-Pixel-Forming Inks

Unit: part(s) by weight

| | Photosensitive green-pigment dispersion B-2 | Photosensitive red-pigment dispersion B-1 | Photosensitive blue-pigment dispersion B-1 |
|---|---|---|---|
| Green pigment colorant composition B-1 | 63 | — | — |
| Red pigment colorant composition B-1 | — | 85 | — |
| Yellow pigment colorant composition B-1 | 37 | 15 | — |
| Blue pigment colorant composition B-1 | — | — | 85 |
| Violet pigment colorant composition B-1 | — | — | 15 |
| Photosensitive acrylic resin varnish | 50 | 50 | 50 |
| TMPTA | 10 | 10 | 10 |
| HEMPA | 2 | 2 | 2 |
| DEAP | 1 | 1 | 1 |
| PGMA | 37 | 37 | 37 |
| Total | 200 | 200 | 200 |

TMPTA, HEMPA and DEAP are as defined in Table 3.

(4) Fabrication of a Color Filter

An RGB color filter was obtained in a similar manner as in Example A-5 except for the use of "the photosensitive red-pigment dispersion B-1", "photosensitive green-pigment dispersion B-2" and "the photosensitive blue-pigment dispersion B-1" of the above procedure (3). The thus-obtained color filter had excellent spectral curve characteristics, was excellent in durability such as light fastness and heat resistance, also had superb properties in light transmission, and showed excellent properties as a color filter for a liquid-crystal color display.

This application claims the priorities of Japanese Patent Application 2005-092276 filed Mar. 28, 2005 and Japanese Patent Application 2005-092277 filed Mar. 28, 2005, both of which are incorporated herein by reference.

The invention claimed is:

1. A pixel-forming colorant composition comprising at least one green colorant selected from the group consisting of the following green pigment derivatives (A) and (B):

(A) a green pigment derivative obtained by introducing at least one sulfone group in a copper phthalocyanine green pigment obtained by reacting at least one of a phthalic acid substituted on average with from 3.5 to 4.0 bromine atoms and a derivative thereof with a copper salt, substituted on average with from 14 to 16 bromine atoms, and substituted with no chlorine atom;

(B) a green pigment derivative obtained by introducing at least one sulfone group in a copper phthalocyanine green pigment obtained by reacting a mixture, which comprises at least one of a phthalic acid having at least one bromine atom and a derivative thereof and at least one of a phthalic acid having at least one chlorine atom and a derivative thereof, with a copper salt, substituted on average with not less than 12 but less than 16 bromine atoms, and substituted on average with not more than 4 but more than 0 chlorine atom(s).

2. A pixel-forming colorant composition according to claim 1, wherein said phthalic acid derivative as a reactant for said copper phthalocyanine green pigment (A) is at least one phthalic acid derivative selected from the group consisting of phthalic anhydrides, phthalodinitriles, phthalimides, phthalamides and phthalamic acids, each of which has been substituted on average with from 3.5 to 4.0 bromine atoms, and salts thereof.

3. A pixel-forming colorant composition according to claim 1, wherein said at least one of said phthalic acid having at least one bromine atom and said derivative thereof is a compound selected from the group consisting of dibromophthalic acid, tribromophthalic acid and tetrabromophthalic acid, anhydrides thereof, dinitrile, acid imide, acid amide and amidic acid derivatives thereof, and salts thereof; and said at least one of said phthalic acid having at least one chlorine atom and said derivative thereof is a compound selected from the group consisting of tribromomonochlorophthalic acid, an anhydride thereof, dinitrile, acid imide, acid amide and amidic acid derivatives thereof, and salts thereof.

4. A pixel-forming colorant composition according to claim 1, wherein said green colorant has an average particle size of from 10 to 130 nm.

5. A pixel-forming colorant composition according to claim 1, wherein said green colorant is a finely-divided pigment obtained by conducting kneading and grinding together with a water-soluble salt in a kneader and having an average particle size of from 10 to 150 nm.

6. A pixel-forming colorant composition according to claim 1, wherein said green pigment derivatives (A) and (B) each have at least one sulfone group at a position substituted with neither a bromine atom nor a chlorine atom.

7. A pixel-forming colorant composition according to claim 1, wherein said green colorant is dispersed in at least one of organic liquid media, organic liquid-water mixed media, aqueous media and solid resin media.

8. A pixel-forming colorant composition according to claim 1, further comprising a yellow pigment.

9. A pixel-forming colorant composition according to claim 1, further comprising, as a film-forming material, at least one of polymers, oligomers and monomers.

10. A pixel-forming ink comprising, as a colorant component, a pixel-forming colorant composition according to claim 1.

11. A color filter fabricated using a pixel-forming ink according to claim 10.

12. A pixel-forming colorant composition according to claim 1, wherein said green colorant is copper pentadecabromophthalocyanine sulfonate and further comprises copper hexadecabromophthalocyanine green pigment.

13. A pixel-forming colorant composition according to claim 1, wherein said green colorant is copper tetradecabromomonochlorophthalocyanine sulfate and further comprises copper tetradecabromodichlorophthalocyanine green pigment.

* * * * *